US006920366B1

(12) United States Patent
Luh et al.

(10) Patent No.: US 6,920,366 B1
(45) Date of Patent: Jul. 19, 2005

(54) HEURISTICS FOR EFFICIENT SUPPLY CHAIN PLANNING IN A HETEROGENEOUS PRODUCTION LINE

(75) Inventors: Ann Luh, Hsin-Chu (TW); Shu-Min Chen, Chu-Bei (TW); Andy Hong, Jhunan Township, Miaoli County (TW); Oliver Wu, Touton Township, Miaoli County (TW); Kathy Wang, Hsin Chu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 10/793,406

(22) Filed: Mar. 4, 2004

(51) Int. Cl.[7] .............................................. G06F 19/00
(52) U.S. Cl. ...................................... 700/101; 700/100
(58) Field of Search ........................... 700/99–101, 102

(56) References Cited

U.S. PATENT DOCUMENTS

| | | | | |
|---|---|---|---|---|
| 4,648,023 A | * | 3/1987 | Powell | 700/36 |
| 4,896,269 A | * | 1/1990 | Tong | 700/101 |
| 5,369,570 A | | 11/1994 | Parad | 364/401 |
| 5,402,350 A | * | 3/1995 | Kline | 700/101 |
| 5,559,710 A | | 9/1996 | Shahraray et al. | 364/468.06 |
| 5,721,686 A | | 2/1998 | Shahraray et al. | 364/468.08 |
| 5,787,283 A | | 7/1998 | Chin et al. | 395/701 |
| 5,946,212 A | | 8/1999 | Bermon et al. | 364/468.03 |
| 5,953,707 A | | 9/1999 | Huang et al. | 705/10 |
| 6,006,192 A | | 12/1999 | Cheng et al. | 705/7 |
| 6,243,612 B1 | * | 6/2001 | Rippenhagen et al. | 700/100 |
| 6,397,192 B1 | | 5/2002 | Notani et al. | 705/9 |
| 6,434,443 B1 | * | 8/2002 | Lin | 700/100 |
| 6,456,996 B1 | | 9/2002 | Crawford, Jr. et al. | 707/1 |
| 6,470,231 B1 | * | 10/2002 | Yang et al. | 700/121 |
| 6,606,529 B1 | | 8/2003 | Crowder, Jr. et al. | 700/100 |
| 2001/0034563 A1 | * | 10/2001 | Matsumoto et al. | 700/101 |
| 2003/0083765 A1 | * | 5/2003 | Nonaka | 700/99 |
| 2004/0186605 A1 | * | 9/2004 | Wu et al. | 700/102 |

OTHER PUBLICATIONS

Bitram et al., "Planning and Scheduling for Epitaxial Wafer Production Facilities", Operations Research, vol. 36, No. 1, 34–39, 1988, Extended Abstract, p. 709.

* cited by examiner

Primary Examiner—Leo Picard
Assistant Examiner—R Jarrett
(74) Attorney, Agent, or Firm—Thomas, Kayden, Horstemeyer & Risley

(57) ABSTRACT

A computer integrated manufacturing system executes a program process that performs a capacity planning method that allocates usage of a plurality of manufacturing elements of a manufacturing enterprise by major and minor apparatus, squeezing for overhead cost consideration, and site balance for maintain basic operation. The program process begins by receiving at least one fabrication forecast describing scheduling and types of product lots that are predicted to be fabricated within a first period of time by the manufacturing enterprise from at least one order management system of the manufacturing enterprise. Rolling statistics of products lots fabricated during a second period of time are retrieved from a data retention device of the computer integrated manufacturing system. Capacity planning for the allocation of the product lot predicted to be fabricated by the manufacturing elements is performed.

50 Claims, 9 Drawing Sheets

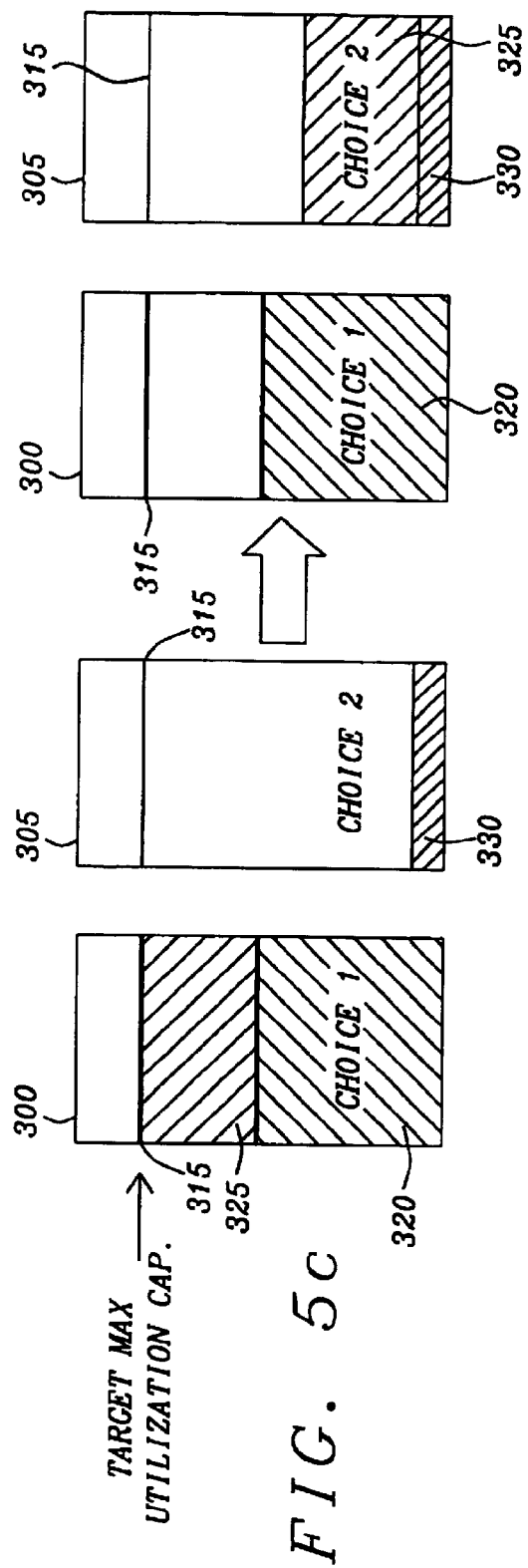
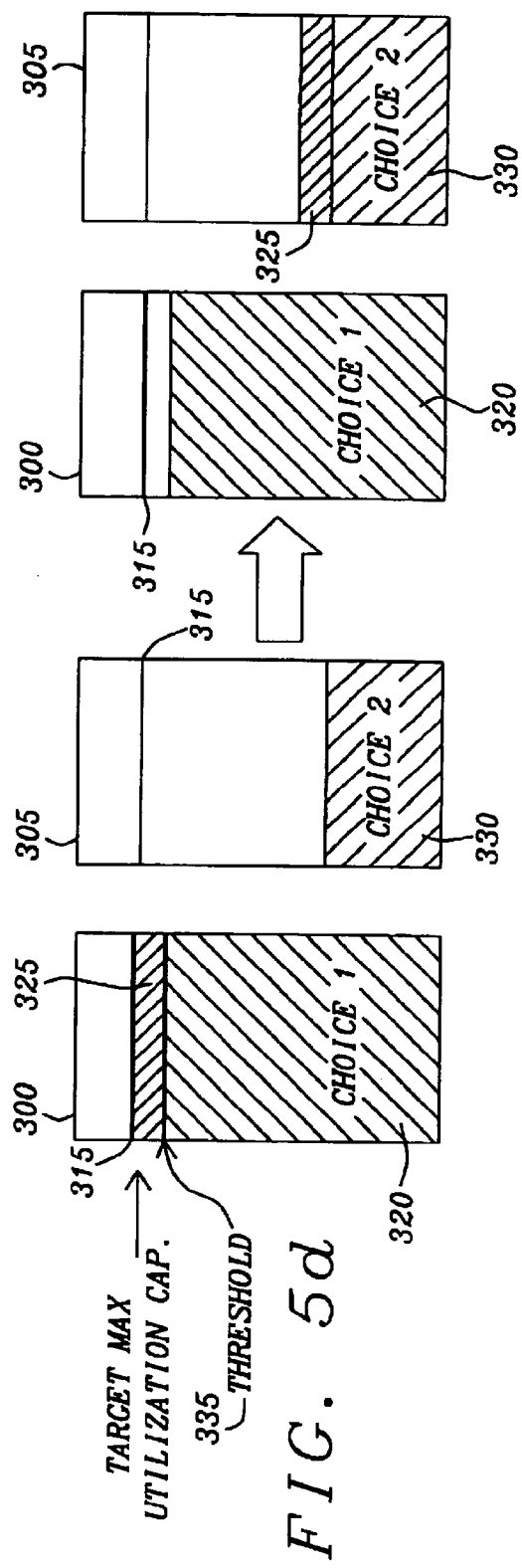
FIG. 5c
FIG. 5d ized manufacturing enterprise. The manufacturing enterprise has a component part procurement unit 5 and a raw material procurement unit 10 which communicates with vendors or subcontractors to acquire the necessary component parts and raw materials for the fabrication of product lots within the enterprise. The component part procurement unit 5 and raw material procurement unit 10 communicate the technical requirements of the component parts and raw material, the negotiated pricing, and required delivery scheduling. The part procurement unit 5 and the raw material procurement unit 10 are respectively connected to the manufacturing execution systems (MES) 35 and 40. The manufacturing execution systems 35 and 40 are connected to the network 65 and thus is in communication with to the computer integrated manufacturing system (CIM) system 90. The CIM system provides the necessary scheduling for the product lots and dispatches the orders for procurement of necessary raw materials and component parts according to the scheduling.

HEURISTICS FOR EFFICIENT SUPPLY CHAIN PLANNING IN A HETEROGENEOUS PRODUCTION LINE

BACKGROUND OF THE INVENTION

1. Field of the Invention

This invention relates generally to computer integrated manufacturing systems and methods. More particularly this invention relates to systems and methods of a computer integrated manufacturing system that performs capacity planning to allocate usage of manufacturing sites, the manufacturing areas within the manufacturing sites, and the equipment within the manufacturing area of a manufacturing enterprise.

2. Description of Related Art

In manufacturing enterprises such as semiconductor fabrication companies commonly referred to as silicon foundries, there are numerous factories at various locations that are capable of fabricating differing types of product. The manufacturing enterprises are classified as having heterogeneous production lines. Each of the factories may have multiple fabrication lines, employing different sets of processing equipment. Currently the acquisition and distribution of raw material, component parts, and work-in-process of the product (the supply chain) of most fabrication lines is highly automated and controlled by computer integrated manufacturing systems (CIM). The CIM system receives dispatch scheduling information regarding the product to be manufactured from an order management system. From the dispatch scheduling information, the CIM system schedules the necessary processing equipment and acquisition and distribution of the raw materials and component parts. The CIM system then starts the manufacturing process and provides monitoring of the processing equipment through manufacturing execution systems within the enterprise. Further, the CIM system provides monitoring of the testing and verification to insure the quality of the product during fabrication and upon completion of fabrication. The CIM system, additionally, controls the location and quantities of storage of the product in inventory and processing of the product for shipment to a customer.

The CIM system employs various software tools for planning capacity of the manufacturing elements of the manufacturing enterprise. These elements are the various factories or sites, the manufacturing areas (production lines or equipment pools) within the factories, and the fabrication, handling, and testing equipment of the manufacturing areas. These software tools normally determine optimization at a local level, for instance between manufacturing areas or among the equipment of the manufacturing area. These software tools do not provide for balancing of the utilization over the entire set of heterogeneous production lines or the whole supply chain for an manufacturing enterprise.

Refer now to FIG. 1 for more discussion of the structure of an automated manufacturing enterprise. The manufactur- The enterprise has a number of factories or fabrication sites 15a, . . . , 15n which in turn have at least one fabrication area, with each fabrication area having the appropriate equipment for fabrication of the product lots. The fabrication sites 15a, . . ., 15n are connected to the MES systems 45a, . . . , 45n. The MES systems 45a, . . . , 45n are connected to the sensors and control circuits of the equipment within each of the fabrication sites 15a, . . . , 15n to determine the status of each piece of manufacturing equipment and control the operation of each piece of the equipment. Further, the MES systems 45a, . . . , 45n provide the local scheduling and dispatch of the product lots to the appropriate equipment to maximize utilization of the manufacturing equipment and expedite processing of the product lots through the fabrication sites 15a, . . . , 15n. The MES systems 45a, . . . , 45n are connected to the network 65 and thus are in communication with the CIM system 90. The CIM system 90 provides the scheduling of the product lots for fabrication and dispatches the product lots to one or the appropriate fabrication sites 15a, . . . , 15n for fabrication. The MES systems 45a, . . . 45n of the fabrication sites 15a, . . . , 15n are in communication with the MES systems 35 and 40 to coordinate delivery of the necessary raw materials to the correct fabrication site 15a, . . . , 15n to insure that the fabrication of the product lots occurs according to the schedule.

At the completion of each procedure of a fabrication process, the product is tested and verified that it meets the requirements of the design of the product. Additionally, at the completion of the total fabrication the product the product is again tested to verify that the product complies with the specifications established for the product. The product testing unit 20 provides the necessary test and verification equipment in either separate test areas within the enterprise or integrated within the fabrication sites 15a, . . . , 15n. The product testing unit 20 is connected to an MES system 50 to provide the scheduling of the testing equipment necessary for the testing and verification processing of the product lots during fabrication and at the completion of the fabrication. The MES system 50 is connected to the network and thus is in communication with the CIM system 90 and the fabrication sites 15a, . . . , 15n. The MES system 50 receives the scheduling to the product lots and the required test parameters and programs necessary to coordinate the testing and verification and to configure the testing equipment for operation.

Any of the procured raw material or component parts that arrive prior to consumption rather than just in time for consumption must be stored in an warehouse and inventoried. Further, during any delays between procedures or stages in the process of fabrication of the work-in-process product maybe placed in a storage area and must be inventoried. Additionally, upon completion of the product and prior to scheduled shipment the product must be placed in a warehouse for storage prior to shipment. The inventory control unit 25 administers the inventory of component parts, raw material, work-in-process product, and completed product. The inventory control unit 25 is connected to the MES system 55. The MES system 55 is connected to the network 65 to communicate with the CIM system 90. The MES system 55 identifies the placement of the component parts, raw material, work-in-process product, and completed product within the warehouse and provides the scheduling for entry and exit of the component parts, raw material, work-in-process product, and completed product from the warehousing based on the product lot scheduling developed by the CIM system 90.

Upon completion of the fabrication of the product, the product is either placed in inventory awaiting scheduled shipment or is sent directly to a shipping unit 30. The shipping unit 30 provides the materials handling services such that the product is transferred appropriately to a customer. The shipping unit 30 is connected to the MES system 60 and is communication with the CIM system 90 which the provides the necessary scheduling for the shipment of the product lots as appropriate.

The order management system 70 controls the marketing and sales database 75. A marketing and sales department enters orders to the order management system 70 when a customer requests fabrication of a product. Further, the marketing and sales department is in contact with the established and potential customers of the manufacturing enterprise to provide an estimate of the product lots that maybe fabricated. This estimate, the current orders for fabrication of product lots, and the history of previously fabricated product lots are placed in the marketing and sales database 75. A fabrication forecast is a planned or predicted schedule of the product lots developed from the estimate of product lots to be fabricated, the current orders for fabrication of product lots, and the history of previously fabricated product lots. This schedule is transferred to the CIM system 90. Further, the industrial engineering system 80 is in communication with the CIM system 90 through the network 65 to provide the identifications and location of the types of the equipment available for fabrication of the planned product lots.

The CIM system 90 receives the planned schedule, the equipment information, and from the process database 95 the process description for each product scheduled to be fabricated. From this information the CIM system 90 creates a supply chain allocation and utilization plan for each product lot to the fabrication sites 15a, . . . , 15n. The distribution of the product lots is balanced to insure that the fabrication sites 15a, . . . , 15n are appropriately utilized. The CIM system 90 then allocates the equipment within the fabrication sites 15a, . . . , 15n. The utilization of the equipment is then balanced by shifting product lots to other equipment or by sub-contracting the services to outside suppliers. The planned schedule is transmitted to the MES systems 35, 40, 45a, . . . , 45n, 50, 55, and 60 to act as a planning vehicle for allocation of the product lots prior to the actual dispatching of the product lots from actual orders.

The method for the development of the supply chain allocation and utilization plan is shown in FIG. 2. The fabrication sites 15a, . . . , 15n of FIG. 1 maybe divided into multiple fabrication units with each unit being divided into multiple fabrication areas. Each fabrication area is structured to contain specific equipment or associated types of equipment necessary for processing the lots of product. The CIM system 90 requests and receives a fabrication forecast 100 for an extended period of time (i.e. 8 weeks) from the order management system 75. The CIM system 90 retrieves the product process description from the process database 95 of FIG. 1 and requests the equipment requirements listing from the industrial engineering system 80 of FIG. 1 to provide a location 110 listing describing the fabrication units containing the necessary equipment for the fabrication each of the product lots. The CIM System 90 then allocates (Box 105) the product lots to the appropriate fabrication units. The CIM system 90 then balances (Box 115) the distribution of the product lots over the fabrication units to insure appropriate utilization. The CIM system 90 then retrieves the product process description 125 from the process database 95 of FIG. 1 and the CIM system then allocates (Box 120) the product lots to the appropriate equipment sites within the fabrication unit. The CIM system 90 then balances (Box 130) the distribution of the product lots over the equipment sites of the fabrication area and provides a report 135 describing the planned equipment utilization and any suggestions for contracting with sub-contractors for performing the appropriate processing of the product lots.

U.S. Pat. No. 6,606,529 (Crowder, Jr., et al.) describes a device and method for the real time optimization of scheduling for manufacturing and information transfer systems. The method generates an optimal solution to a scheduling problem by employing a filtering algorithm to schedule minimally-conflicting events. The remaining unscheduled events are partitioned into non-interactive sub-sets. Following partitioning, artificial intelligence is used to select one of a plurality of algorithms which is employed to provide an optimal scheduling solution for each sub-set of scheduling requests. The purpose of artificial intelligence is to recognize certain characteristics in request data comprising each subset of event scheduling requests and select an algorithm which is optimal for scheduling each particular sub-set.

U.S. Pat. No. 6,006,192 (Cheng, et al.) details a decision-making method suitable for production planning in an uncertain demand environment. The method combines an implosion technology with a scenario-based analysis, thus manifesting, a customization capability which preserves the advantages and benefits of each of its subsumed aspects.

U.S. Pat. No. 5,953,707 (Huang, et al.) describes a decision support system for the management of an agile supply chain that provides an architecture including a server side and a client side. A servers includes a decision support system database that interfaces with a model engine that performs analysis of the data to support planning decisions and a server manager that coordinates requests for service and information. The client includes decision frames that present the various view points available in the system to the users. A frame manager coordinates the requests from decision support frames to access the needed data and models. The decision support frames provide a view into the supply chain and integrate analytical models responsive to the view point of a business process such as demand management. The frames include a supply management frame, a demand management frame, a vendor managed replenishment frame, a Planning, Sales and Inventory planning frame, and a distribution network design frame.

U.S. Pat. No. 5,787,283 (Chin, et al.) teaches a framework suitable for manufacturing logistics decision support. An object-oriented technology framework which defines objects representing manufacturing logistics problems; transforms a subject of the above objects into representations commonly used in a mathematical solver, wherein the representations in the solver have predefined relationships based on their properties. The behavior of the framework is modified upon selective changes in the objects to develop a new manufacturing logistics decision support application.

U.S. Pat. Nos. 5,721,686 and 5,559,710 (Shahraray, et al.) teach an improved system and method for scheduling a plurality of orders into a factory for processing by one or more of a plurality of machines based on the use of a continuity Index job release strategy. The system and method is particularly addressed to the enhancement of such a job release strategy by introduction of factory profile and priority criteria and an algorithm for automatic determination of an optimum job release point based on such criteria.

U.S. Pat. No. 5,369,570 (Parad) describes a method for continuous real-time management of heterogeneous interdependent resources. The method uses multiple distributed resource engines to maintain timely and precise schedules, and action controls, and identifying and responding to rapidly changing conditions in accord with predetermined requirements, relationships, and constraints. Each resource engine continuously adjusts schedules in response to changing status, resource requirements, relationships and constraints. Each action control maintains an ordered list of conditions requiring action, determines the best action in each case, and generates appropriate responses.

U.S. Pat. No. 6,456,996 (Crawford, Jr., et al) describes a method and system for solving constrained optimization problems. An initial abstract solution represents a prioritized set of decisions. The abstract solution is used as the basis for building a concrete solution. The concrete solution is analyzed to determine one or more local moves that represent a re-prioritization of the abstract solution. After a local moves is made, the process begins again with a new abstract solution that is closer to an optimal solution. This process continues interactively until an optimal solution is reached or approached. The prioritized set of decisions can be implemented as a priority vector or a priority graph.

U.S. Pat. No. 6,397,192 (Notani, et al.) teaches a computer implemented method for workflow synchronization is provided. The first step comprises initializing the execution of a plurality of workflows. The next step is providing synchronization logic in at least one of the plurality of workflows. In the third step the execution of a workflow is paused until the synchronization logic is complete. In the final step the execution of the plurality of workflows continues.

U.S. Pat. No. 5,946,212 (Bermon, et al.) illustrates a computer implemented method that provides accurate capacity planning for manufacturing environments comprising parallel, unrelated tools that can process the same operations at different rates and with preferences for the sequence in which those tools are selected to accommodate the workload. The method reliably determines, precisely, the gating tools among sets of parallel, unrelated tools in a complex manufacturing environment in which different tools can perform the same or similar sets of operations, generally, at different rates. The primary, secondary, etc. tool groups in each cascade set are explicitly kept track of in order to enable the correct penalty function to be associated with the appropriate tool group.

G. R. Bitran and D. Tirupati, "Planning and Scheduling for Epitaxial Wafer Production Facilities," Operations Research, Vol. 36, No. 1, 34–49, 1988 describes. models used for scheduling jobs for epitaxial growth on semiconductor substrates in the reactors. This stage was a bottleneck operation of a semiconductor wafer processor. A facility with different product groups is consider and several heuristics two criteria are proposed. A non-linear programming problem is formulated to assign reactors to product groups to obtain homogeneous product mix. The significance of this model is due to the fact that homogeneous product set enables use of a simpler heuristic and reduces the complexity of the scheduling system. The non-linear program can be interpreted as an attempt to identify, within the facility, smaller independent shops with homogeneous product groups.

SUMMARY OF THE INVENTION

An object of this invention is to provide a method for establishing priority product lots to be fabricated by manufacturing elements of a manufacturing enterprise by establishing heuristic guidelines developed from running statistics of previous product lot fabrication.

Another object of this invention is to provide a method for allocating manufacturing elements of a manufacturing enterprise where certain manufacturing elements are to be idled and product lots are to be squeezed into fabrication by certain overloaded manufacturing elements.

Further, another object of this invention is to balance allocation of product lots among manufacturing elements of a manufacturing enterprise to avoid idling certain manufacturing elements having little or not allocation to fabrication of product lots.

Even further, another object of this invention is to provide a method that determines a best match of manufacturing elements to product lots to be fabricated.

To provide at least one of these objects, a computer integrated manufacturing system executes a program process that performs a capacity planning method that allocates usage of a plurality of manufacturing elements of a manufacturing enterprise. The capacity planning method begins by receiving at least one fabrication forecast describing scheduling and types of product lots that are predicted to be fabricated within a first period of time by the manufacturing enterprise from at least one order management system of the manufacturing enterprise. Rolling statistics of products lots fabricated during a second period of time are retrieved from a data retention device of the computer integrated manufacturing system. Capacity planning for the allocation of the product lot predicted to be fabricated by the manufacturing elements is performed.

The capacity planning begins by determining a priority ranking of the product lots predicted to be fabricated from heuristics developed from the product lots fabricated during the second period of time The predicted product lots allocated to the manufacturing elements, and then balanced the manufacturing elements according to manufacturing element balancing guidelines.

The heuristics of the priority ranking are developed by determining a standard priority for the product lots fabricated during the second period of time.

The manufacturing elements employed in fabrication of the product lots fabricated during the second period of time are determined. The product identification of the product lots predicted to be fabricated are compared with the product lots fabricated in the second period of time and the standard priority is assigned to the product lots predicted to be fabricated. A major preference and a minor preference are assigned for the manufacturing elements for the product lots predicted to be fabricated.

The manufacturing element balancing guidelines include squeezing one product lot predicted to be fabricated to one of the manufacturing elements rather than transferring the product lot to another of the manufacturing element, if a cost of the transfer is too great. The manufacturing element balancing guidelines further include balancing fabrication of the plurality of product lots predicted to be fabricated among the manufacturing elements to maintain operation of the manufacturing elements during periods of low utilization of at least one of the manufacturing elements. Alternately, the manufacturing element balancing guidelines also include balancing fabrication of the plurality of product lots predicted to be fabricated among the manufacturing elements to adjust placement of the plurality of product lots predicted to be fabricated to eliminate an overloaded utilization of those manufacturing elements with an overloaded utilization. Additionally, the manufacturing element balancing guideline include selecting placement of the plurality product lots predicted to be fabricated to at least one manufacturing element having a best match to provide capacity for fabrication of the product lot.

The squeezing of one product lot predicted to be fabricated to one of the manufacturing elements begins by selecting one manufacturing elements with a capability to process the product lot predicted to be fabricated, but with a utilization approaching a full capacity level and selecting a plurality of manufacturing elements each with a capability to process the product lot predicted to be fabricated but with a low utilization. The squeezing of one product lot to the manufacturing element with the utilization approaching the full capacity level continues by determining a first overhead associated with placing the product lot predicted to be fabricated with each of plurality of manufacturing elements. A second overhead for squeezing the product lot predicted to be fabricated into the manufacturing element with a utilization approaching full capacity is then determined. If the first overhead is greater than second overhead, the product lot predicted to be fabricated is placed into the manufacturing element with a utilization approaching full capacity.

The balancing fabrication of the plurality of product lots predicted to be fabricated among the manufacturing elements to maintain operation of the manufacturing elements during periods of low utilization of the manufacturing elements begins by determining a utilization rate of each of the manufacturing elements. If any of the manufacturing elements have a utilization rate less that a differential threshold of other of the manufacturing elements, a third overhead for idling manufacturing elements with little or no utilization is determined. Then a fourth overhead for maintaining operation in manufacturing elements with little or no utilization is determined. If the fourth over head is less than the third overhead, at least one product lot predicted to be fabricated is assigned to the manufacturing elements with little or no utilization. Further, the balancing fabrication of the plurality of product lots predicted to be fabricated among the manufacturing elements to maintain operation of the manufacturing elements during periods of low utilization of the manufacturing continues by squeezing at least one product lot predicted to be fabricated to the other of the manufacturing elements, if the fourth over head is greater than the third overhead.

The balancing fabrication of the plurality of product lots predicted to be fabricated among the manufacturing elements to adjust placement of the plurality of product lots predicted to be fabricated to eliminate an overloaded utilization of those manufacturing elements with an overloaded utilization begins by determining the utilization rate of each of the manufacturing elements. If one of the manufacturing elements has a utilization rate greater than a utilization threshold, it is then determined whether any of the manufacturing elements has a capability matching capability requirements of the manufacturing elements with a utilization rate greater than the utilization threshold. An assignment of product lots predicted to be fabricated is transferred to those at least one of the those manufacturing elements with the capability matching the capability requirements of the product lot predicted to be fabricated.

The selecting placement of one product lot predicted to be fabricated to at least one manufacturing element having a best match to provide capacity for fabrication of the product lot begins by determining capability requirements for each of the product lots predicted to be fabricated and determining capabilities for each of the manufacturing elements. The capabilities of each of the manufacturing elements are compared and the product lots predicted to be fabricated are assigned to those manufacturing elements with capabilities that match the capability requirements of the product lots predicted to be fabricated. The utilization rate for each of the manufacturing elements is determined and the which of the manufacturing elements have a utilization rate greater than the utilization threshold is determined. One of other manufacturing elements based on a candidate ranking is selected. It is then determined if the selected other manufacturing element has a capability that matches the capability requirement of product lot predicted to be fabricated assigned to the manufacturing element with the utilization rate greater than the utilization threshold. If the capability of the selected other manufacturing element matches the capability requirement, determining if the selected other manufacturing element has capacity to accept assignment of the product lot predicted to be fabricated and the product lot predicted to be fabricated is assigned to the selected other manufacturing element for fabrication. The selecting placement of one product lot predicted to be fabricated to at least one manufacturing element having a best match to provide capacity for fabrication of the product lot further determines if the selected other manufacturing element can accept assignment of a portion of the product lot predicted to be fabricated, if the selected other manufacturing element does not have capacity to accept assignment of the product lot predicted to be fabricated. If the selected other manufacturing element can accept assignment of the portion of the product lot predicted to be fabricated, a portion of the product lot predicted to be fabricated is assigned to the selected other manufacturing element.

The manufacturing elements are either manufacturing fabrication facilities, manufacturing fabrication areas within a fabrication facility, raw material providers, component part providers, fabrication processing equipment within the fabrication areas, fabrication verification and testing equipment associated with the fabrication areas, or fabrication subcontractors providing fabrication services for the manufacturing fabrication areas.

BRIEF DESCRIPTION OF THE DRAWINGS

FIGS. 5a–d are diagrams illustrating the allocation and balancing of fabrication of product within manufacturing elements of a manufacturing enterprise of this invention.

DETAILED DESCRIPTION OF THE INVENTION

A capacity planning processor system acting either independently or integrated with a CIM system acquires a product lot forecast for a first period of time, for instance 8 weeks, from an order management system. The capacity planning processor system also acquires a set of rolling statistics for a second period of time, for instance 3 months describing the types of product lots fabricated and the priorities of those product lots. A set of exception rules are retrieved. The exception rules describe the capacity allocation assigned to product lots for certain customers, the groups of manufacturing elements (manufacturing facilities, manufacturing areas, and manufacturing equipment units) or individual types of manufacturing equipment that are used to fabricate the product lots. This information is used to develop a set of heuristics that determine a priority ranking for each lot of product predicted to be fabricated in the first period of time. The capacity planning processor system then allocates the product lots to the manufacturing facilities, the manufacturing areas, and to the individual manufacturing equipment units.

As described for the prior art, the capacity planning achieves optimization for usage of the individual manufacturing equipment units, but can not achieve a balance in the utilization of the manufacturing facilities or the manufacturing areas within the facilities. The capacity planning processor system of this invention provides for balancing of the allocation of the usages of the manufacturing elements according to whether product lots are squeezed into a manufacturing element such that another manufacturing element maybe idled; whether the product lots are to be distributed over the manufacturing elements to have under utilized or potentially idled manufacturing elements remain functioning; or to determine the best matching of utilization of the manufacturing elements of the enterprise.

The capacity planning processor system then creates the necessary reports indicating the potential delays that may occur in the balancing of the allocation of the product lots to the manufacturing elements, the manufacturing facilities master production schedule and the forecast for the future utilization for the future usage of the manufacturing elements.

Figure 1:
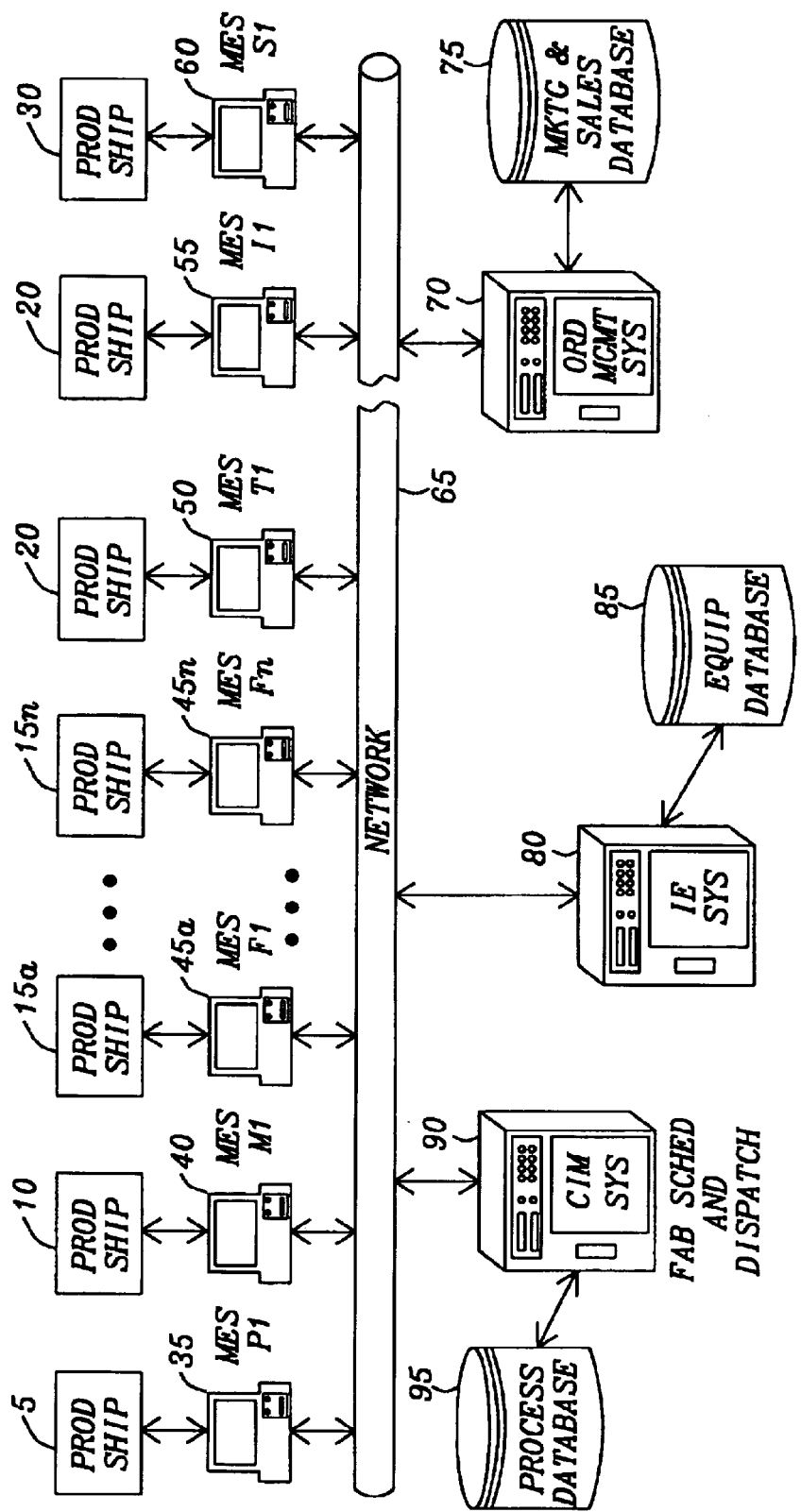
FIG. 1 is a diagram of a manufacturing enterprise illustrating the interconnections of the computer control systems of the manufacturing elements of the manufacturing enterprise of the prior art.
Figure 2:
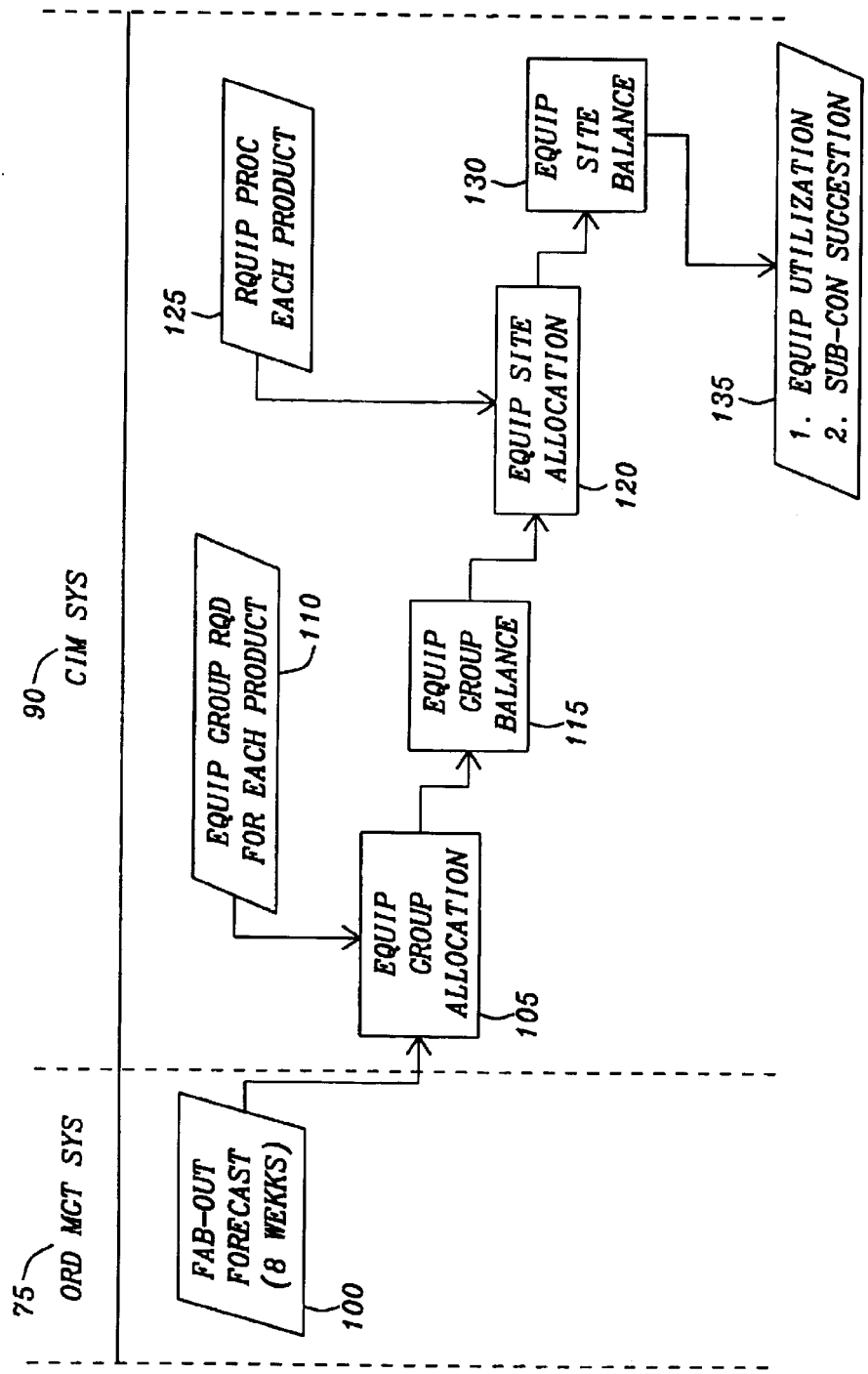
FIG. 2 is a flow chart of the method for allocation and balancing fabrication of products to manufacturing elements of a manufacturing enterprise of the prior art.
Figure 3:
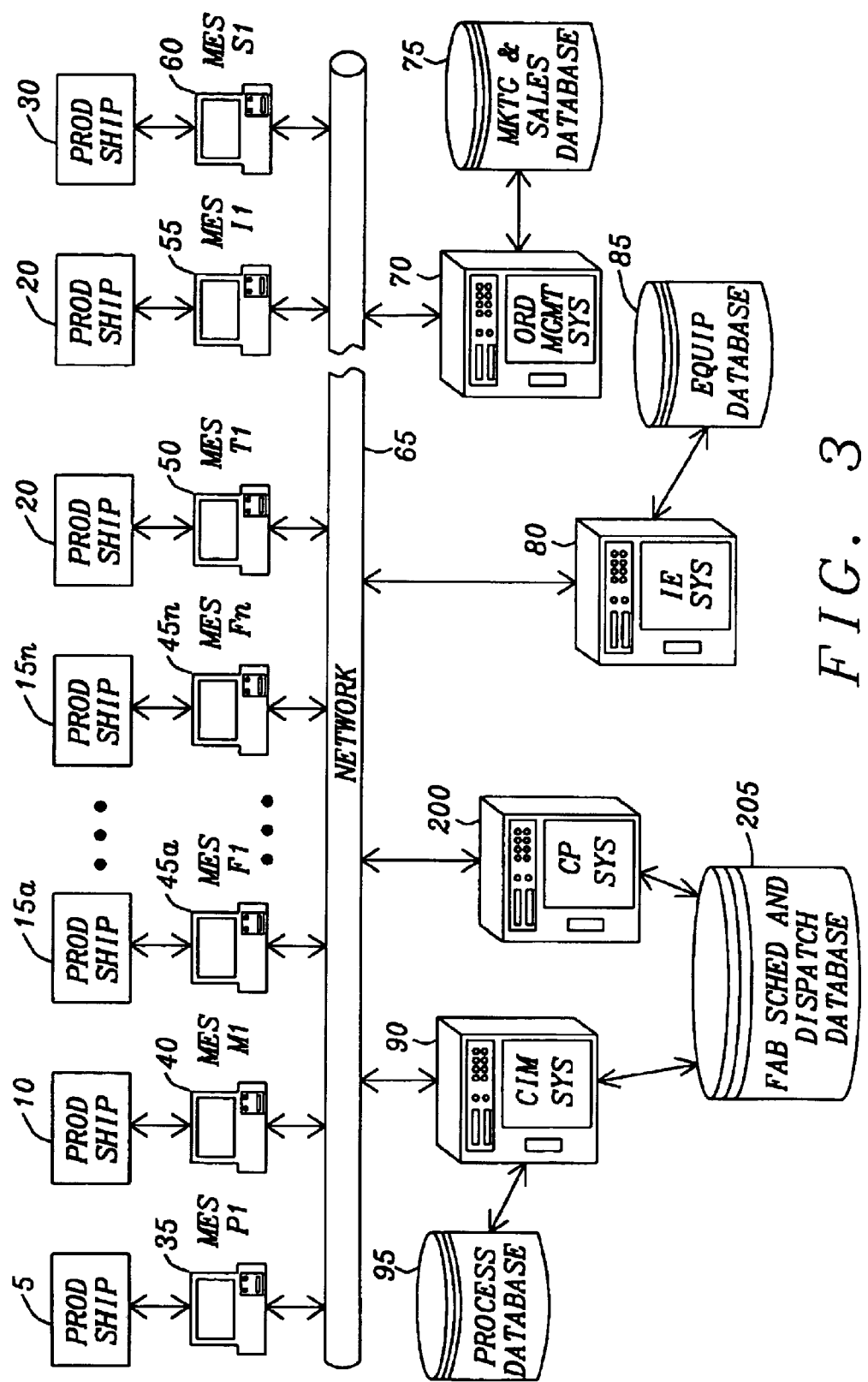
FIG. 3 is a diagram of a manufacturing enterprise illustrating the interconnections of the computer control systems of the manufacturing elements of the manufacturing enterprise of this invention.

Refer now to FIG. 3 for a more detailed discussion of manufacturing enterprise with the capacity planning processor system of this invention. The manufacturing enterprise includes the manufacturing elements as described in FIG. 1. The capacity planning processor system 200 is connected to the network 65 to communicate with the CIM system 90, the industrial engineering system 80, and the order management system 70. The product lot fabrication scheduling and dispatch database 205 is connected to communicate with the CIM system 90 and the capacity planning processor system 200. The CIM system 90 provides the scheduling and dispatch to the allocated product lots once the orders for the product is received from the order management system 70.

It should be noted that the capacity planning processor system 200 is shown as a separate entity from the CIM system 90, however, it is in keeping with the intent of this invention and in fact would generally be that the capacity planning processor system 200 and the CIM system 90 are integrated within the same computer system. The separation is shown for ease of description of the function of the capacity planning processor system 200.

Figure 4:
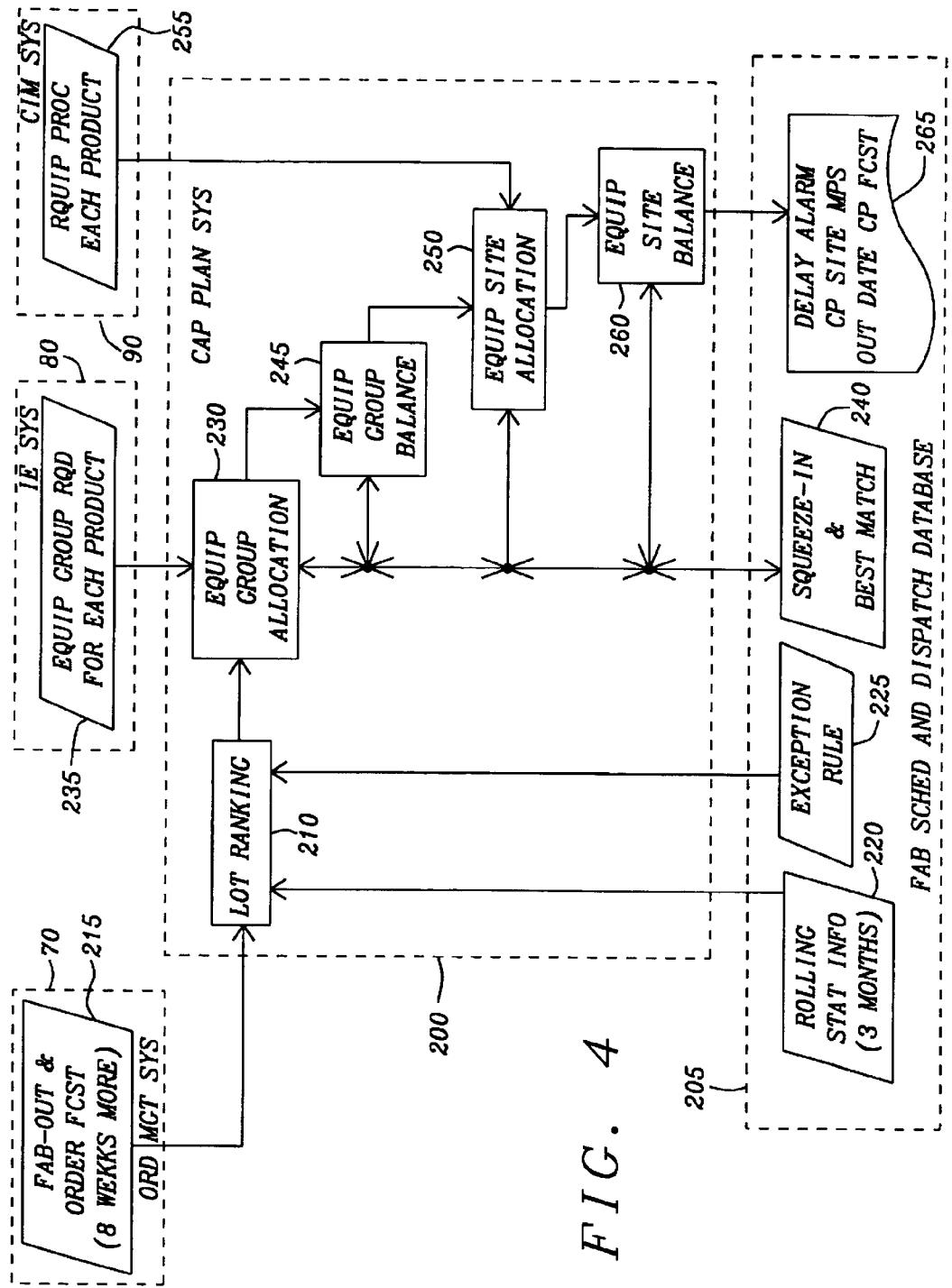
FIG. 4 is a flow chart of the method for allocation and balancing fabrication of products to manufacturing elements of a manufacturing enterprise of this invention.

The capacity planning processor system 200 executes a program process that is retained within a program data retention device within the capacity planning processor system 200. The program data retention device is a device as a random access memory, magnetic or optical storage media, or storage nodes connected to the network 65 (not shown). The program process as executed by the capacity planning processor system 200 performs the method as shown in FIG. 4. The capacity planning system 200 requests that the order management system retrieve the fabrication and order forecast 215 from the order marketing and sales database 75 of FIG. 3. The fabrication and order forecast 215 describes the predicted types and quantities of products to be fabricated over a first period of time (i.e. 8 weeks). The fabrication and order forecast 215 includes a predicted schedule for the arrival of the orders and the priorities that these orders will have Some customers have negotiated priority commitments for delivery of product lots and will have a higher priority that other product lots. The capacity planning system 200 retrieves the rolling statistical information 220 from the product lot fabrication scheduling and dispatch database 205. The rolling statistical information 220 describes the quantities and types of products that were fabricated over a second period (i.e. 3 months). The capacity planning processor system 200 then retrieves the exception rules 225 from the product lot fabrication scheduling and dispatch database 205. The capacity planning processor system 200 ranks (Box 210) the predicted product lots of the fabrication and order forecast 295 based on the rolling statistics information 220 and the exception rule 225.

The capacity planning processor system 200 requests that the industrial engineering system retrieve an equipment group requirements for each predicted product lot 235 from the equipment database 85 of FIG. 3. The capacity planning processor system 200 then allocates (Box 230) equipment groups that are to be assigned to fabricate the predicted lots of product and then balances (Box 245) the allocation base upon the allocation and balancing guidelines 240 retrieved from product lot fabrication scheduling and dispatch database 205 The equipment group includes the part procurement unit 5, the raw material procurement unit 10, the fabrication sites 15a, . . . , 15n, the inventory control unit 25, inventory control unit 25, and the shipping unit 30 of any manufacturing facility of the manufacturing enterprise. The capacity planning processor system 200 then allocates (Box 250) the predicted product lots to equipment sites or manufacturing areas within the equipment groups within the manufacturing facility and then balances (Box 260) the allocation of the predicted product lots base on the allocation and balancing guidelines 240 retrieved from the product lot fabrication scheduling and dispatch database 205. The capacity planning processor system 200 then generates a report 265 providing any alarms that indicate that certain product can not be scheduled within the requirements of the fabrication and order forecast 295, the capacity planned master production schedule, and the forecast for the scheduling and allocation of the predicted product lots. The report 265 is retained by the product lot fabrication scheduling and dispatch database 205.

Figure 5A:
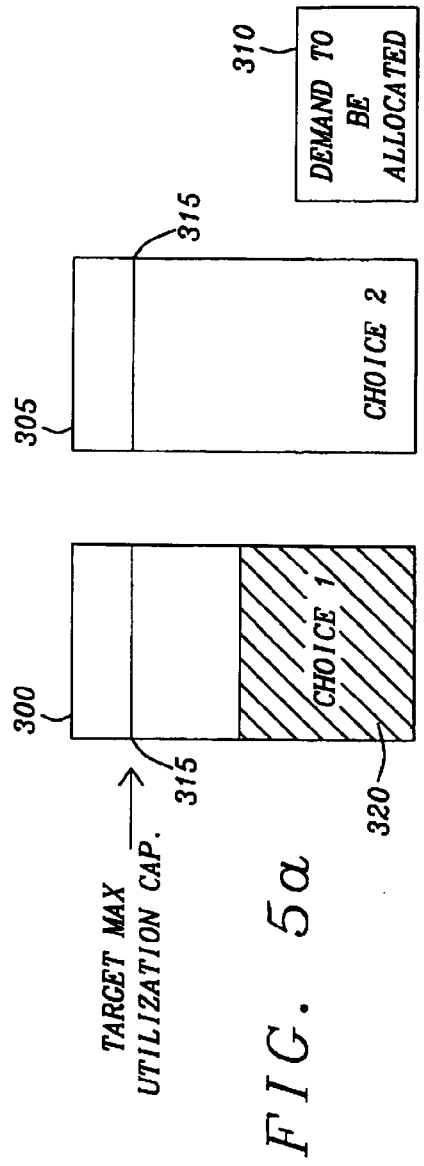

Refer to FIGS. 5a–5d for a discussion of the allocation and balancing guidelines 240. FIG. 5a illustrates two choices of manufacturing elements (facilities, areas, or equipment) 300 and 305 for a grouping for processing a heterogeneous grouping of product lots. The demand allocated 320 is assigned to the manufacturing element 300. The new demand 310 is to be allocated according to the guidelines 240 of FIG. 4. Each of the manufacturing elements 300 and 305 has a target maximum utilization capacity 315. The target maximum utilization capacity 315 is set to some level than full utilization to prevent overloading of the manufacturing elements 300 and 305 to insure efficiency of operation.

Figure 5B:
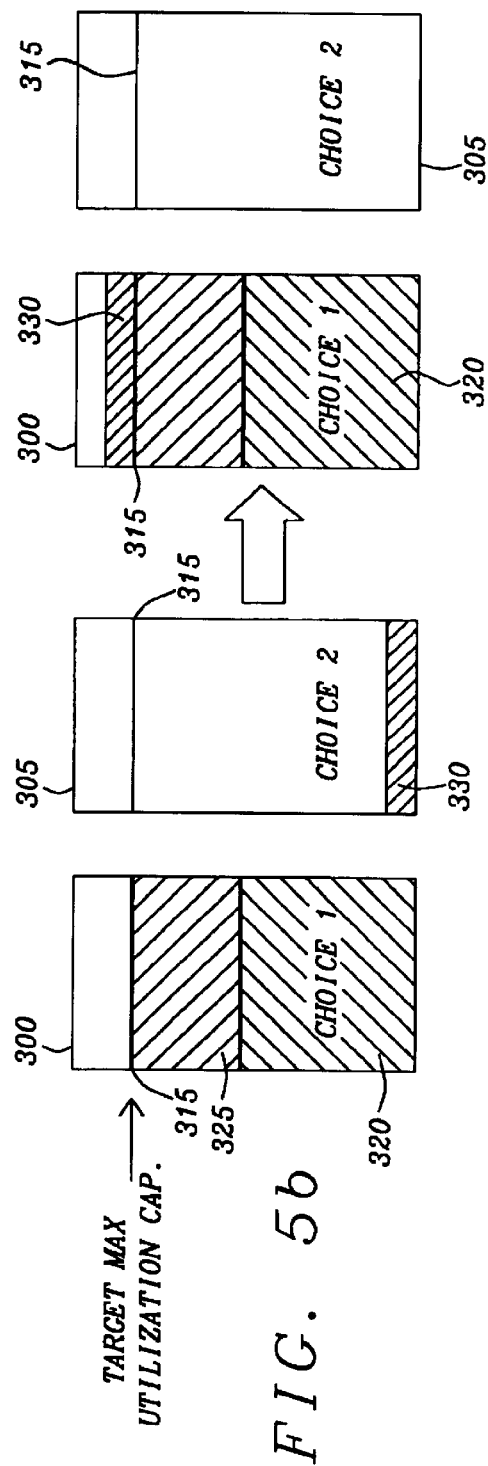

FIG. 5b illustrates a squeezing of demand to be allocated to the manufacturing elements 300 and 305. In a normal selection of the manufacturing elements 300 and 305, the manufacturing element 300 would receive the portion 325 of the demand 310 and the manufacturing element 305 receives the remaining portion 330 of the demand 310. The overhead cost for usage of the manufacturing element 305 and the overhead cost for leaving the manufacturing elements 305 idle and "squeezing" the portion 330 of the demand 310 to the manufacturing element 300 are calculated. If the overhead cost of usage of the manufacturing element 305 is greater than the overhead cost for leaving the manufacturing element 305 idle and "squeezing" the portion 330 of the demand 310 to the manufacturing element 300, that portion is allocated to the manufacturing element 300 over and above target maximum utilization capacity 315.

FIG. 5c illustrates the alternative where the overhead cost of usage of the manufacturing element 305 is less than the overhead cost for leaving the manufacturing element 305 idle and "squeezing" the portion 330 of the demand 310 to the manufacturing element 300. In this instance the portion of the demand 325 is assigned to the manufacturing element 305 such that the whole demand 310 is allocated to the manufacturing element 305. The total demand 320 and 310 is thus balanced over the manufacturing elements 300 and 305.

In FIG. 5d, the first allocated demand 320 is sufficiently large that it approaches a maximum desirable utilization threshold 335 that is somewhat lower than the target maximum utilization capacity 315. In a normal allocation, a portion 325 of the demand 310 would be assigned to the manufacturing element 300 and the remainder to the manufacturing element 305. However a best fit of the demand 310 would be to place it such that both portions 325 and 330 of product lots would be allocated to the manufacturing element 305.

Figure 6:
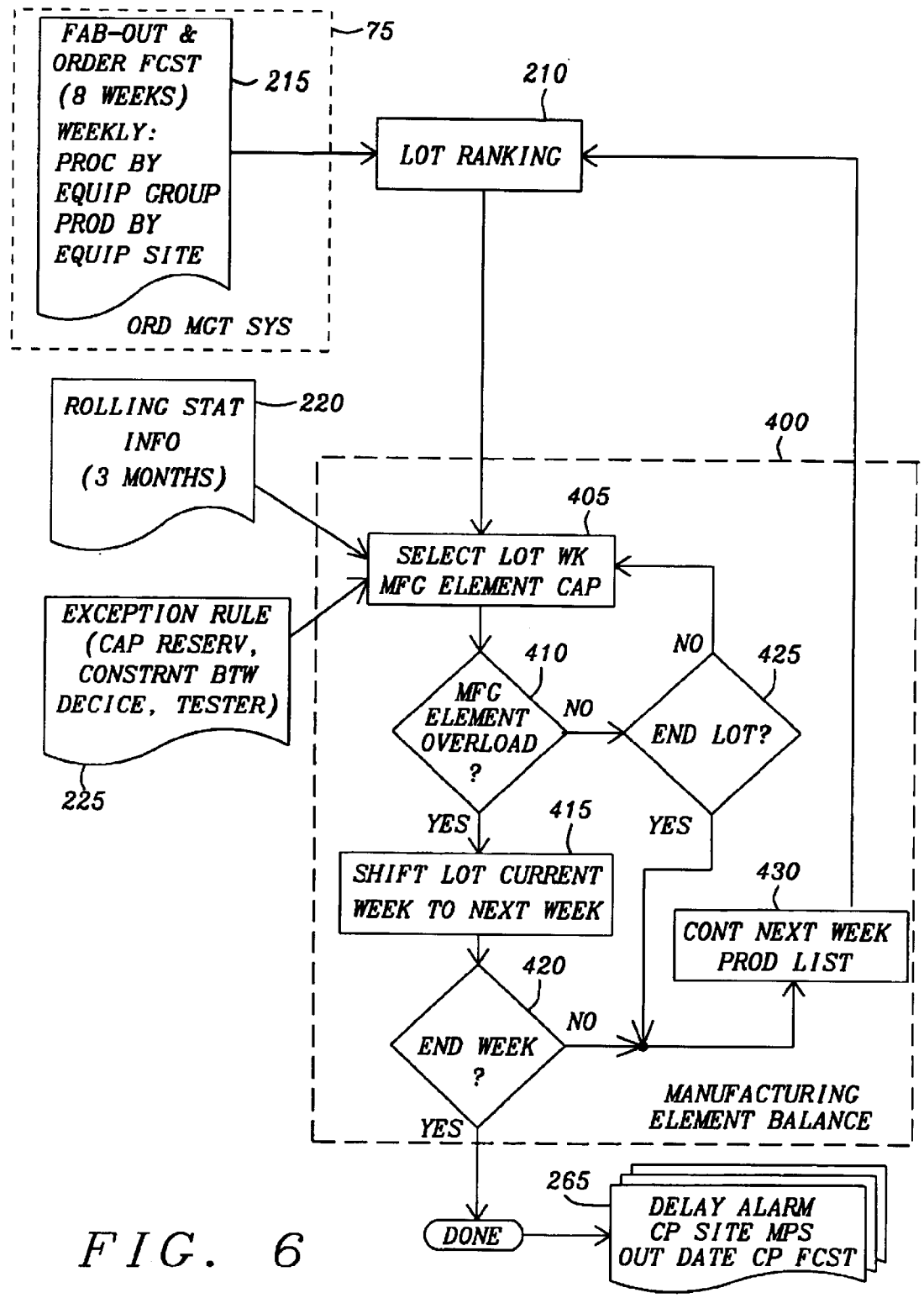
FIG. 6 is flow chart of one embodiment of the balancing of fabrication of products to manufacturing elements of this invention.

The balancing (Box 400) of the manufacturing elements, equipment group (Box 230) or equipment site or area (Box 250) of FIG. 3, is shown in FIG. 6. From the lot ranking (Box 210), the rolling statistical information 220, and the exception rules 225, a lot of the predicted product is selected (Box 405) for allocation to a particularly manufacturing element. The capacity of the particular manufacturing element is examined (Box 410). If the manufacturing element is not overloaded, the lot is examined (Box 425) to determine that the product lot is totally scheduled. If the portion of the predicted lot is not scheduled, the remaining portion of the predicted lot of product is selected (Box 405). If the manufacturing element is overloaded, rather than shifting the product lot to another manufacturing element, the time scheduling of the lot is shifted to the following time period (week) (Box 415). The scheduling period for this scheduling is examined (Box 420) to determine whether the final period of the forecast time (8 weeks) is scheduled. If the lots for the current period are not scheduled, the processing is continued (Box 430) for the next period (week) and the lot ranking is processed (Box 210) for the succeeding week. If the scheduling for the forecast period is complete, the report 265 providing any alarms that indicate that certain product can not be scheduled within the requirements of the fabrication and order forecast 215, the capacity planned master production schedule, and the forecast for the scheduling and allocation of the predicted product lots is generated.

Figure 7:
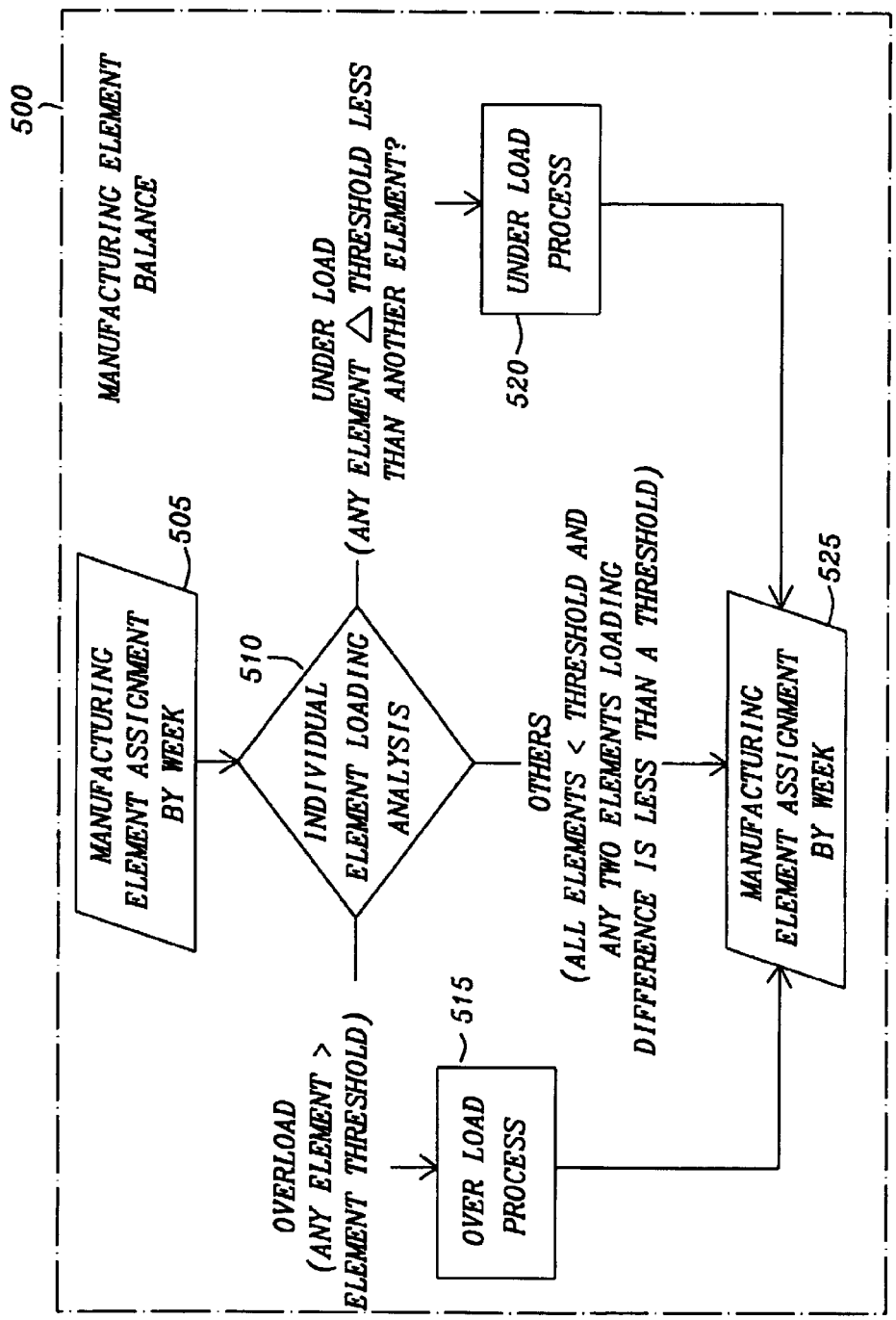
FIG. 7 is a flow chart of a second embodiment of the balancing of fabrication of products to manufacturing elements of this invention.

FIG. 7 shows a second embodiment of the process of the balancing of the distribution of the predicted product lots over manufacturing elements. The results of the allocation of the equipment groups (Box 230) and the equipment site allocation (Box 250) of FIG. 3 is an assignment 505 of the product lots to the manufacturing elements (equipment groups or equipment sites). The manufacturing element balancing (Box 500) analyzes (Box 510) the individual manufacturing element loading of the predicted product lots by a portion (week) of the period (8 weeks) of the forecast allocation. If the any manufacturing element has a utilization greater than a threshold level (i.e. 85% of maximum utilization) the manufacturing element having an overload condition is balanced (Box 515) according to an overload process. The overload process will distribute the product to other manufacturing elements having capacity and a best match for capacity and capability as described above or will attempt "squeeze" the lots in to the overloaded manufacturing element even if other manufacturing elements are to be under utilized or idled. Alternately, if any two or more manufacturing elements have a differential in the loading greater than a threshold, the manufacturing elements have their predicted product lot allocations balanced (Box 520) to essentially equalize their utilization. This process (Box 520) is essentially shown in FIG. 5d.

Upon completion of the overload process (Box 515), the under-load process (Box 520), or if all manufacturing element have a utilization less than the threshold or the differential between two or more manufacturing element is less than the differential threshold, an adjusted assignment 525 of the product lots to the manufacturing elements (equipment groups or equipment sites) is generated.

Figure 8:
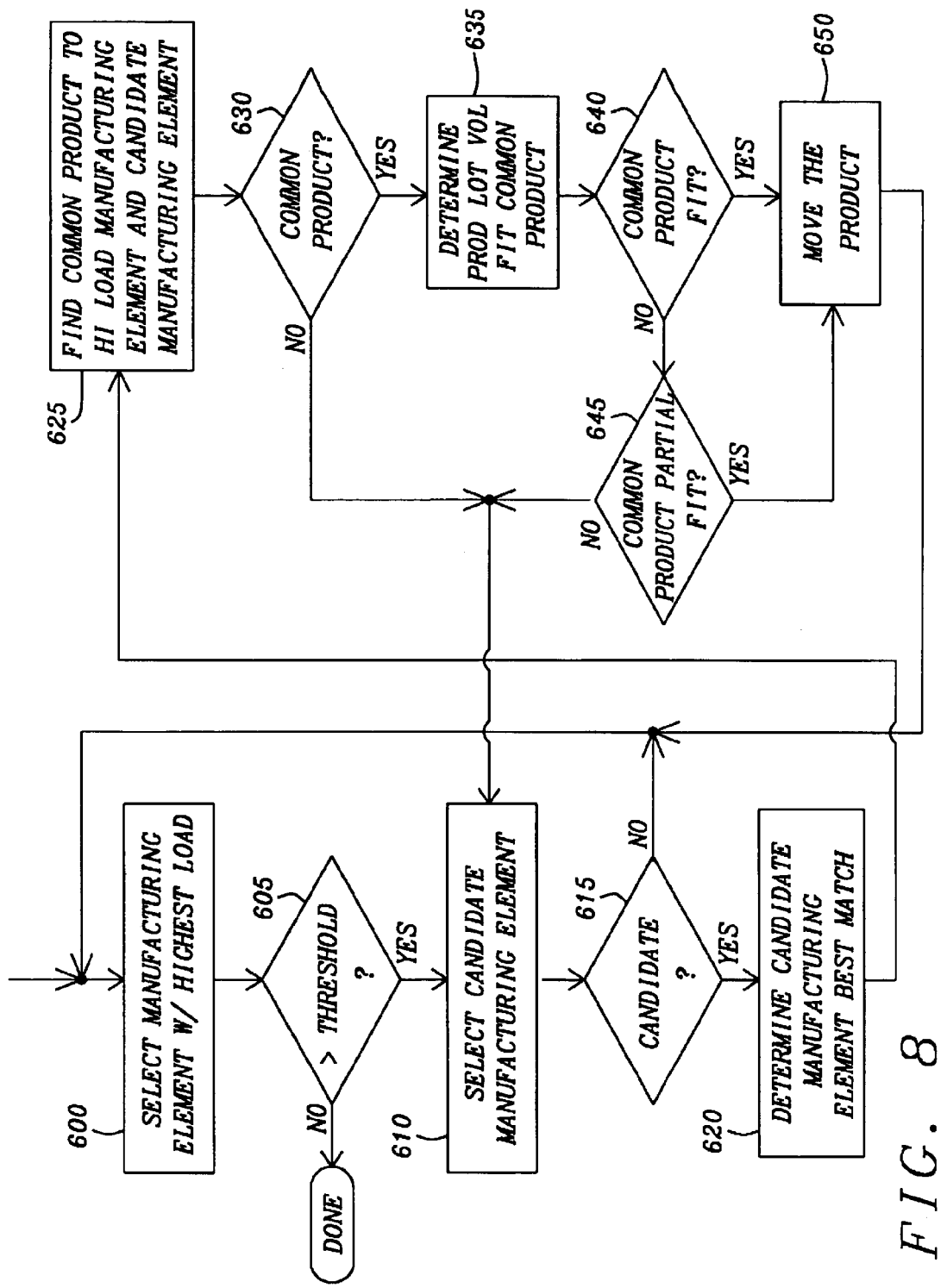
FIG. 8 is a flow chart of a flow chart of a third embodiment of balancing of fabrication of products to manufacturing elements of this invention.

A third embodiment of the process of the balancing of the distribution of the predicted product lots over manufacturing elements is shown in FIG. 8. A manufacturing element is selected (Box 600) from the assignment of the product lots to the manufacturing elements (equipment groups or equipment sites). The utilization of the manufacturing is evaluated (Box 605) for being greater than the utilization threshold. If the utilization of the selected manufacturing element are less than the utilization threshold the process of balancing is complete. If the utilization of the selected manufacturing element is greater than the threshold, another candidate manufacturing element is selected (Box 610). The manufacturing elements are ranks according to the following order:

1. Those manufacturing elements geographically in dose proximity. Their utilization is ranked from the manufacturing elements with the least utilization to the manufacturing elements having the highest utilization rate less than the utilization threshold.
2. Those manufacturing elements geographically in farther from the selected manufacturing element. Their utilization is ranked from the manufacturing elements with the least utilization to the manufacturing elements having the highest utilization rate less than the utilization threshold.
3. Subcontractor facilities having the capabilities of the selected manufacturing element. The subcontractor facilities being ranked according to their desirability and capability for performing the function of the selected manufacturing product.

The alternate candidate manufacturing elements are evaluated (Box 615) to establish their suitability for as an alternate candidate. If there are not alternates, the next manufacturing element is selected (Box 600) and the process repeated. If there is a suitable candidate, the suitable candidate manufacturing elements are next evaluated (Box 620) for the best match according to the equation:

$$BEST\_Match=\min(|excessT\text{-}V-TotalProductT\text{-}V|$$

AND $$(excessT\text{-}V>=TotalProductT\text{-}V)$$

where:
BEST_Match being the manufacturing element of the suitable candidate manufacturing elements.
T-V is the time-volume capacity of a manufacturing element (minutes of processing per part of product).
excessT-V is the amount of time-volume capacity that a manufacturing element has in excess of its current allocation.
TotalProductT-V is the time-volume capacity of the manufacturing element.

The common predicted common product lots within the selected manufacturing element having a high loading is found (Box 625) within the allocation of the suitable candidate manufacturing element. It is evaluated (Box 630) whether a common predicted product lot exists. If none exists the next candidate manufacturing element is selected (Box 610). If a common predicted product lots exists, it is then determined (Box 635) whether the common predicted product lot will fit into the allocation of the candidate manufacturing element. If the common predicted product lot does not fit the allocation of the candidate manufacturing element, it is then determined whether a portion of the common predicted product lot will fit the allocation of the candidate manufacturing element. If it will not the next candidate manufacturing element is selected (Box 610). If all or a portion of the common predicted product lot will fit the candidate manufacturing element, the predicted product lot allocation is moved (Box 650) to the candidate manufacturing element to balance the allocation of the predicted product lots over the manufacturing elements.

While this invention has been particularly shown and described with reference to the preferred embodiments thereof, it will be understood by those skilled in the art that various changes in form and details may be made without departing from the spirit and scope of the invention.

The invention claimed is:

1. A capacity planning system that allocates usage of a plurality of manufacturing elements of a manufacturing enterprise comprising:
a capacity planning processor in communications with at least one order management system of said manufacturing enterprise to receive at least one fabrication forecast describing scheduling and types of product lots that are predicted to be fabricated within a first period of time by said manufacturing enterprise and in communication with at least one computer integrated manufacturing system to receive rolling statistics of products lots fabricated during a second period of time,
wherein said capacity planning processor performs the steps of:
determining a priority ranking of said product lots predicted to be fabricated from heuristics developed from said product lots fabricated during said second period of time,
allocating of said predicted product lots to said manufacturing elements, and
balancing said predicted product lots between said manufacturing elements according to manufacturing element balancing guidelines.

2. The capacity planning system of claim 1 wherein said heuristics are developed by the steps of:
determining a standard priority for said product lots fabricated during said second period of time;
determining the manufacturing elements employed in fabrication of said product lots fabricated in said second period of time;
comparing product identification of said product lots predicted to be fabricated with said product lots fabricated in said second period of time;
assigning the standard priority to said product lots predicted to be fabricated; and
assigning a major preference and a minor preference for said manufacturing elements for said product lots predicted to be fabricated.

3. The capacity planning system of claim 1 wherein said manufacturing elements are selected from the group of manufacturing elements consisting of manufacturing fabrication facilities, manufacturing fabrication areas within a fabrication facility, raw material providers, component part providers, fabrication processing equipment within said fabrication areas, fabrication verification and testing equipment associated with said fabrication areas, and fabrication sub-contractors providing fabrication services for said manufacturing fabrication areas.

4. The capacity planning system of claim 1 wherein manufacturing element balancing guidelines comprise:
squeezing one product lot predicted to be fabricated to one of said manufacturing elements rather than transferring said product lot to another of said manufacturing element, if a cost of said transfer is too great;
balancing fabrication of the plurality of product lots predicted to be fabricated among said manufacturing elements to maintain operation of said manufacturing elements during periods of low utilization of at least one of said manufacturing elements;
balancing fabrication of the plurality of product lots predicted to be fabricated among said manufacturing elements to adjust placement of the plurality of product lots predicted to be fabricated to eliminate an overloaded utilization of those manufacturing elements with an overloaded utilization; and
selecting placement of the plurality product lots predicted to be fabricated to at least one manufacturing element having a best match to provide capacity for fabrication of said product lot.

5. The capacity planning system of claim 4 wherein squeezing one product lot predicted to be fabricated to one of said manufacturing elements is executed by performing the steps of:
selecting one manufacturing element with a capability to process said product lot predicted to be fabricated, but with a utilization approaching a full capacity level;
selecting a plurality of manufacturing elements each with a capability to process said product lot predicted to be fabricated but with a low utilization;
determining a first overhead associated with placing the product lot predicted to be fabricated with each of plurality of manufacturing elements;
determining a second overhead for squeezing said product lot predicted to be fabricated into said manufacturing element with a utilization approaching full capacity; and if said first overhead is greater than second overhead, placing said product lot predicted to be fabricated into said manufacturing element with a utilization approaching full capacity.

6. The capacity planning system of claim 4 wherein balancing fabrication of the plurality of product lots predicted to be fabricated among said manufacturing elements to maintain operation of said manufacturing elements during periods of low utilization of said manufacturing elements comprises the steps of:

determining a utilization rate of each of said manufacturing elements;

if any of said manufacturing elements have a utilization rate less that a differential threshold of other of said manufacturing elements, determining a third overhead for idling manufacturing elements with little or no utilization;

determining a fourth overhead for maintaining operation in manufacturing elements with little or no utilization; and if the fourth overhead is less than the third overhead, assigning at least one product lot predicted to be fabricated to said manufacturing elements with little or no utilization.

7. The capacity planning system of claim 6 wherein balancing fabrication of the plurality of product lots predicted to be fabricated among said manufacturing elements to maintain operation of said manufacturing elements during periods of low utilization of said manufacturing elements further comprises the steps of:

if the fourth overhead is greater than the third overhead, squeezing at least one product lot predicted to be fabricated to the other of said manufacturing elements.

8. The capacity planning system of claim 4 wherein balancing fabrication of the plurality of product lots predicted to be fabricated among said manufacturing elements to adjust placement of the plurality of product lots predicted to be fabricated to eliminate an overloaded utilization of those manufacturing elements with an overloaded utilization comprises the steps of:

determining the utilization rate of each of the manufacturing elements;

if one of the manufacturing elements has a utilization rate greater than a utilization threshold, determining whether any of the manufacturing elements has a capability matching capability requirements of the manufacturing elements with a utilization rate greater than the utilization threshold; and transferring an assignment of product lots predicted to be fabricated to these at least one of the those manufacturing elements with the capability matching the capability requirements of the product lot predicted to be fabricated.

9. The capacity planning system of claim 4 wherein selecting placement of one product lot predicted to be fabricated to at least one manufacturing element having a best match to provide capacity for fabrication of said product lot comprises the steps of:

determining capability requirements for each of the product lots predicted to be fabricated;

determining capabilities for each of the manufacturing elements;

comparing the capabilities of each of the manufacturing elements;

assigning product lots predicted to be fabricated to those manufacturing elements with capabilities that match the capability requirements of the product lots predicted to be fabricated;

determining a utilization rate for each of the manufacturing elements;

determining which of said manufacturing elements have a utilization rate greater than a utilization threshold;

selecting one of other manufacturing elements based on a candidate ranking;

determining if the selected other manufacturing element has a capability that matches the capability requirement of product lot predicted to be fabricated assigned to the manufacturing element with the utilization rate greater than said utilization threshold;

if said capability of said selected other manufacturing element matches said capability requirement, determining if said selected other manufacturing element has capacity to accept assignment of said product lot predicted to be fabricated; and assigning said product lot predicted to be fabricated to said selected other manufacturing element for fabrication.

10. The capacity planning system of claim 9 wherein selecting placement of one product lot predicted to be fabricated to at least one manufacturing element having a best match to provide capacity for fabrication of said product lot further comprises the steps of:

if said selected other manufacturing element does not have capacity to accept assignment of said product lot predicted to be fabricated; determining if said selected other manufacturing element can accept assignment of a portion of said product lot predicted to be fabricated; and if said selected other manufacturing element can accept assignment of said portion of said product lot predicted to be fabricated, assigning the portion of said product lot predicted to be fabricated.

11. A computer-implemented capacity planning method that allocates usage of a plurality of manufacturing elements of a manufacturing enterprise comprising the steps of:

receiving from at least one order management system of said manufacturing enterprise at least one fabrication forecast describing scheduling and types of product lots that are predicted to be fabricated within a first period of time by said manufacturing enterprise;

receiving from at least one computer integrated manufacturing system rolling statistics of products lots fabricated during a second period of time; and planning capacity allocation of product lots predicted to be fabricated to said manufacturing elements by the steps of:

determining a priority ranking of said product lots predicted to be fabricated from heuristics developed from said product lots fabricated during said second period of time, allocating of said predicted product lots to said manufacturing elements, and balancing said predicted product lots between said manufacturing elements according to manufacturing element balancing guidelines.

12. The computer-implemented capacity planning method of claim 11 wherein said heuristics are developed by the steps of:

determining a standard priority for said product lots fabricated during said second period of time;

determining the manufacturing elements employed in fabrication of said product lots fabricated in said second period of time;

comparing product identification of said product lots predicted to be fabricated with said product lots fabricated in said second period of time;

assigning the standard priority to said product lots predicted to be fabricated; and assigning a major preference and a minor preference for said manufacturing elements for said product lots predicted to be fabricated.

13. The computer-implemented capacity planning method of claim 11 wherein said manufacturing elements are selected from the group of manufacturing elements consisting of manufacturing fabrication facilities, manufacturing fabrication areas within a fabrication facility, raw material providers, component part providers, fabrication processing equipment within said fabrication areas, fabrication verification and testing equipment associated with said fabrication areas, and fabrication sub-contractors providing fabrication services for said manufacturing fabrication areas.

14. The computer-implemented capacity planning method of claim 11 wherein manufacturing element balancing guidelines comprise:

squeezing one product lot predicted to be fabricated to one of said manufacturing elements rather than transferring said product lot to another of said manufacturing element, if a cost of said transfer is too great;

balancing fabrication of the plurality of product lots predicted to be fabricated among said manufacturing elements to maintain operation of said manufacturing elements during periods of low utilization of at least one of said manufacturing elements;

balancing fabrication of the plurality of product lots predicted to be fabricated among said manufacturing elements to adjust placement of the plurality of product lots predicted to be fabricated to eliminate an overloaded utilization of those manufacturing elements with an overloaded utilization; and selecting placement of the plurality product lots predicted to be fabricated to at least one manufacturing element having a best match to provide capacity for fabrication of said product lot.

15. The computer-implemented capacity planning method of claim 14 wherein squeezing one product lot predicted to be fabricated to one of said manufacturing elements is executed by performing the steps of:

selecting one manufacturing elements with a capability to process said product lot predicted to be fabricated, but with a utilization approaching a full capacity level;

selecting a plurality of manufacturing elements each with a capability to process said product lot predicted to be fabricated but with a low utilization;

determining a first overhead associated with placing the product lot predicted to be fabricated with each of plurality of manufacturing elements;

determining a second overhead for squeezing said product lot predicted to be fabricated into said manufacturing element with a utilization approaching full capacity; and if said first overhead is greater than second overhead, placing said product lot predicted to be fabricated into said manufacturing element with a utilization approaching full capacity.

16. The computer-implemented capacity planning method of claim 14 wherein balancing fabrication of the plurality of product lots predicted to be fabricated among said manufacturing elements to maintain operation of said manufacturing elements during periods of low utilization of said manufacturing elements comprises the steps of:

determining a utilization rate of each of said manufacturing elements;

if any of said manufacturing elements have a utilization rate less that a differential threshold of other of said manufacturing elements, determining a third overhead for idling manufacturing elements with little or no utilization;

determining a fourth overhead for maintaining operation in manufacturing elements with little or no utilization; and if the fourth overhead is less than the third overhead, assigning at least one product lot predicted to be fabricated to said manufacturing elements with little or no utilization.

17. The computer-implemented capacity planning method of claim 16 wherein balancing fabrication of the plurality of product lots predicted to be fabricated among said manufacturing elements to maintain operation of said manufacturing elements during periods of low utilization of said manufacturing elements further comprises the steps of:

if the fourth overhead is greater than the third overhead, squeezing at least one product lot predicted to be fabricated to the other of said manufacturing elements.

18. The computer-implemented capacity planning method of claim 14 wherein balancing fabrication of the plurality of product lots predicted to be fabricated among said manufacturing elements to adjust placement of the plurality of product lots predicted to be fabricated to eliminate an overloaded utilization of those manufacturing elements with an overloaded utilization comprises the steps of:

determining the utilization rate of each of the manufacturing elements;

if one of the manufacturing elements has a utilization rate greater than a utilization threshold, determining whether any of the manufacturing elements has a capability matching capability requirements of the manufacturing elements with a utilization rate greater than the utilization threshold; and transferring an assignment of product lots predicted to be fabricated to at least one of the those manufacturing elements with the capability matching the capability requirements of the product lot predicted to be fabricated.

19. The computer-implemented capacity planning method of claim 14 wherein selecting placement of one product lot predicted to be fabricated to at least one manufacturing element having a best match to provide capacity for fabrication of said product lot comprises the steps of:

determining capability requirements for each of the product lots predicted to be fabricated;

determining capabilities for each of the manufacturing elements;

comparing the capabilities of each of the manufacturing elements;

assigning product lots predicted to be fabricated to those manufacturing elements with capabilities that match the capability requirements of the product lots predicted to be fabricated;

determining a utilization rate for each of the manufacturing elements;

determining which of said manufacturing elements have a utilization rate greater than a utilization threshold;

selecting one of other manufacturing elements based on a candidate ranking;

determining if the selected other manufacturing element has a capability that matches the capability requirement of product lot predicted to be fabricated assigned to the manufacturing element with the utilization rate greater than said utilization threshold;

if said capability of said selected other manufacturing element matches said capability requirement, determining if said selected other manufacturing element has capacity to accept assignment of said product lot predicted to be fabricated; and assigning said product lot predicted to be fabricated to said selected other manufacturing element for fabrication.

20. The computer-implemented capacity planning method of claim 19 wherein selecting placement of one product lot predicted to be fabricated to at least one manufacturing element having a best match to provide capacity for fabrication of said product lot further comprises the steps of:

if said selected other manufacturing element does not have capacity to accept assignment of said product lot predicted to be fabricated; determining if said selected other manufacturing element can accept assignment of a portion of said product lot predicted to be fabricated; and if said selected other manufacturing element can accept assignment of said portion of said product lot predicted to be fabricated, assigning the portion of said product lot predicted to be fabricated.

21. A capacity planning apparatus that allocates usage of a plurality of manufacturing elements of a manufacturing enterprise comprising:

means for receiving from at least one order management system of said manufacturing enterprise at least one fabrication forecast describing scheduling and types of product lots that are predicted to be fabricated within a first period of time by said manufacturing enterprise;

means for receiving from at least one computer integrated manufacturing system rolling statistics of products lots fabricated during a second period of time; and means for planning capacity allocation of product lots predicted to be fabricated to said manufacturing elements, said means for planning capacity allocation comprising:

means for determining a priority ranking of said product lots predicted to be fabricated from heuristics developed from said product lots fabricated during said second period of time, means for allocating of said predicted product lots to said manufacturing elements, and means for balancing said predicted product lots between said manufacturing elements according to manufacturing element balancing guidelines.

22. The capacity planning apparatus of claim 21 wherein said heuristics are developed by the steps of:

determining a standard priority for said product lots fabricated during said second period of time;

determining the manufacturing elements employed in fabrication of said product lots fabricated in said second period of time;

comparing product identification of said product lots predicted to be fabricated with said product lots fabricated in said second period of time;

assigning the standard priority to said product lots predicted to be fabricated; and assigning a major preference and a minor preference for said manufacturing elements for said product lots predicted to be fabricated.

23. The capacity planning apparatus of claim 21 wherein said manufacturing elements are selected from the group of manufacturing elements consisting of manufacturing fabrication facilities, manufacturing fabrication areas within a fabrication facility, raw material providers, component part providers, fabrication processing equipment within said fabrication areas, fabrication verification and testing equipment associated with said fabrication areas, and fabrication sub-contractors providing fabrication services for said manufacturing fabrication areas.

24. The capacity planning apparatus of claim 21 wherein manufacturing element balancing guidelines comprise:

squeezing one product lot predicted to be fabricated to one of said manufacturing elements rather than transferring said product lot to another of said manufacturing element, if a cost of said transfer is too great;

balancing fabrication of the plurality of product lots predicted to be fabricated among said manufacturing elements to maintain operation of said manufacturing elements during periods of low utilization of at least one of said manufacturing elements;

balancing fabrication of the plurality of product lots predicted to be fabricated among said manufacturing elements to adjust placement of the plurality of product lots predicted to be fabricated to eliminate an overloaded utilization of those manufacturing elements with an overloaded utilization; and selecting placement of the plurality product lots predicted to be fabricated to at least one manufacturing element having a best match to provide capacity for fabrication of said product lot.

25. The capacity planning apparatus of claim 24 wherein squeezing one product lot predicted to be fabricated to one of said manufacturing elements is executed by performing the steps of:

selecting one manufacturing element with a capability to process said product lot predicted to be fabricated, but with a utilization approaching a full capacity level;

selecting a plurality of manufacturing elements each with a capability to process said product lot predicted to be fabricated but with a low utilization;

determining a first overhead associated with placing the product lot predicted to be fabricated with each of plurality of manufacturing elements;

determining a second overhead for squeezing said product lot predicted to be fabricated into said manufacturing element with a utilization approaching full capacity; and if said first overhead is greater than second overhead, placing said product lot predicted to be fabricated into said manufacturing element with a utilization approaching full capacity.

26. The capacity planning apparatus of claim 24 wherein balancing fabrication of the plurality of product lots predicted to be fabricated among said manufacturing elements to maintain operation of said manufacturing elements during periods of low utilization of said manufacturing elements comprises the steps of:

determining a utilization rate of each of said manufacturing elements;

if any of said manufacturing elements have a utilization rate less that a differential threshold of other of said manufacturing elements, determining a third overhead for idling manufacturing elements with little or no utilization;

determining a fourth overhead for maintaining operation in manufacturing elements with little or no utilization; and if the fourth overhead is less than the third overhead, assigning at least one product lot predicted to be fabricated to said manufacturing elements with little or no utilization.

27. The capacity planning apparatus of claim 26 wherein balancing fabrication of the plurality of product lots predicted to be fabricated among said manufacturing elements to maintain operation of said manufacturing elements during periods of low utilization of said manufacturing elements further comprises the steps of:

if the fourth overhead is greater than the third overhead, squeezing at least one product lot predicted to be fabricated to the other of said manufacturing elements.

28. The capacity planning apparatus of claim 24 wherein balancing fabrication of the plurality of product lots predicted to be fabricated among said manufacturing elements to adjust placement of the plurality of product lots predicted to be fabricated to eliminate an overloaded utilization of those manufacturing elements with an overloaded utilization comprises the steps of:

determining the utilization rate of each of the manufacturing elements;

if one of the manufacturing elements has a utilization rate greater than a utilization threshold, determining whether any of the manufacturing elements has a capability matching capability requirements of the manufacturing elements with a utilization rate greater than the utilization threshold; and transferring an assignment of product lots predicted to be fabricated to at least one of the those manufacturing elements with the capability matching the capability requirements of the product lot predicted to be fabricated.

29. The capacity planning apparatus of claim 24 wherein selecting placement of one product lot predicted to be fabricated to at least one manufacturing element having a best match to provide capacity for fabrication of said product lot comprises the steps of:

determining capability requirements for each of the product lots predicted to be fabricated;

determining capabilities for each of the manufacturing elements;

comparing the capabilities of each of the manufacturing elements;

assigning product lots predicted to be fabricated to those manufacturing elements with capabilities that match the capability requirements of the product lots predicted to be fabricated;

determining a utilization rate for each of the manufacturing elements;

determining which of said manufacturing elements have a utilization rate greater than a utilization threshold;

selecting one of other manufacturing elements based on a candidate ranking;

determining if the selected other manufacturing element has a capability that matches the capability requirement of product lot predicted to be fabricated assigned to the manufacturing element with the utilization rate greater than said utilization threshold;

if said capability of said selected other manufacturing element matches said capability requirement, determining if said selected other manufacturing element has capacity to accept assignment of said product lot predicted to be fabricated; and assigning said product lot predicted to be fabricated to said selected other manufacturing element for fabrication.

30. The capacity planning apparatus of claim 29 wherein selecting placement of one product lot predicted to be fabricated to at least one manufacturing element having a best match to provide capacity for fabrication of said product lot further comprises the steps of:

if said selected other manufacturing element does not have capacity to accept assignment of said product lot predicted to be fabricated; determining if said selected other manufacturing element can accept assignment of a portion of said product lot predicted to be fabricated; and if said selected other manufacturing element can accept assignment of said portion of said product lot predicted to be fabricated, assigning the portion of said product lot predicted to be fabricated.

31. A computer integrated manufacturing system that executes a program process that performs a capacity planning method that allocates usage of a plurality of manufacturing elements of a manufacturing enterprise, the program process comprising the steps of:

receiving from at least one order management system of said manufacturing enterprise at least one fabrication forecast describing scheduling and types of product lots that are predicted to be fabricated within a first period of time by said manufacturing enterprise;

receiving from at least one computer integrated manufacturing system rolling statistics of products lots fabricated during a second period of time; and planning capacity allocation of product lots predicted to be fabricated to said manufacturing elements by the steps of:

determining a priority ranking of said product lots predicted to be fabricated from heuristics developed from said product lots fabricated during said second period of time, allocating of said predicted product lots to said manufacturing elements, and balancing said predicted product lots between said manufacturing elements according to manufacturing element balancing guidelines.

32. The computer integrated manufacturing system of claim 31 wherein said heuristics are developed by the steps of:

determining a standard priority for said product lots fabricated during said second period of time;

determining the manufacturing elements employed in fabrication of said product lots fabricated in said second period of time;

comparing product identification of said product lots predicted to be fabricated with said product lots fabricated in said second period of time;

assigning the standard priority to said product lots predicted to be fabricated; and assigning a major preference and a minor preference for said manufacturing elements for said product lots predicted to be fabricated.

33. The computer integrated manufacturing system of claim 31 wherein said manufacturing elements are selected from the group of manufacturing elements consisting of manufacturing fabrication facilities, manufacturing fabrication areas within a fabrication facility, raw material providers, component part providers, fabrication processing equipment within said fabrication areas, fabrication verification and testing equipment associated with said fabrication areas, and fabrication sub-contractors providing fabrication services for said manufacturing fabrication areas.

34. The computer integrated manufacturing system of claim 31 wherein manufacturing element balancing guidelines comprise:
squeezing one product lot predicted to be fabricated to one of said manufacturing elements rather than transferring said product lot to another of said manufacturing element, if a cost of said transfer is too great;
balancing fabrication of the plurality of product lots predicted to be fabricated among said manufacturing elements to maintain operation of said manufacturing elements during periods of low utilization of at least one of said manufacturing elements;
balancing fabrication of the plurality of product lots predicted to be fabricated among said manufacturing elements to adjust placement of the plurality of product lots predicted to be fabricated to eliminate an overloaded utilization of those manufacturing elements with an overloaded utilization; and
selecting placement of the plurality product lots predicted to be fabricated to at least one manufacturing element having a best match to provide capacity for fabrication of said product lot.

35. The computer integrated manufacturing system of claim 34 wherein squeezing one product lot predicted to be fabricated to one of said manufacturing elements is executed by performing the steps of:
selecting one manufacturing element with a capability to process said product lot predicted to be fabricated, but with a utilization approaching a full capacity level;
selecting a plurality of manufacturing elements each with a capability to process said product lot predicted to be fabricated but with a low utilization;
determining a first overhead associated with placing the product lot predicted to be fabricated with each of plurality of manufacturing elements;
determining a second overhead for squeezing said product lot predicted to be fabricated into said manufacturing element with a utilization approaching full capacity; and
if said first overhead is greater than second overhead, placing said product lot predicted to be fabricated into said manufacturing element with a utilization approaching full capacity.

36. The computer integrated manufacturing system of claim 34 wherein balancing fabrication of the plurality of product lots predicted to be fabricated among said manufacturing elements to maintain operation of said manufacturing elements during periods of low utilization of said manufacturing elements comprises the steps of:
determining a utilization rate of each of said manufacturing elements;
if any of said manufacturing elements have a utilization rate less that a differential threshold of other of said manufacturing elements, determining a third overhead for idling manufacturing elements with little or no utilization;
determining a fourth overhead for maintaining operation in manufacturing elements with little or no utilization; and
if the fourth overhead is less than the third overhead, assigning at least one product lot predicted to be fabricated to said manufacturing elements with little or no utilization.

37. The computer integrated manufacturing system of claim 36 wherein balancing fabrication of the plurality of product lots predicted to be fabricated among said manufacturing elements to maintain operation of said manufacturing elements during periods of low utilization of said manufacturing elements further comprises the steps of:
if the fourth overhead is greater than the third overhead, squeezing at least one product lot predicted to be fabricated to the other of said manufacturing elements.

38. The computer integrated manufacturing system of claim 34 wherein balancing fabrication of the plurality of product lots predicted to be fabricated among said manufacturing elements to adjust placement of the plurality of product lots predicted to be fabricated to eliminate an overloaded utilization of those manufacturing elements with an overloaded utilization comprises the steps of:
determining the utilization rate of each of the manufacturing elements;
if one of the manufacturing elements has a utilization rate greater than a utilization threshold, determining whether any of the manufacturing elements has a capability matching capability requirements of the manufacturing elements with a utilization rate greater than the utilization threshold; and
transferring an assignment of product lots predicted to be fabricated to at least one of the those manufacturing elements with the capability matching the capability requirements of the product lot predicted to be fabricated.

39. The computer integrated manufacturing system of claim 34 wherein selecting placement of one product lot predicted to be fabricated to at least one manufacturing element having a best match to provide capacity for fabrication of said product lot comprises the steps of:
determining capability requirements for each of the product lots predicted to be fabricated;
determining capabilities for each of the manufacturing elements;
comparing the capabilities of each of the manufacturing elements;
assigning product lots predicted to be fabricated to those manufacturing elements with capabilities that match the capability requirements of the product lots predicted to be fabricated;
determining a utilization rate for each of the manufacturing elements;
determining which of said manufacturing elements have a utilization rate greater than a utilization threshold;
selecting one of other manufacturing elements based on a candidate ranking;
determining if the selected other manufacturing element has a capability that matches the capability requirement of product lot predicted to be fabricated assigned to the manufacturing element with the utilization rate greater than said utilization threshold;
if said capability of said selected other manufacturing element matches said capability requirement, determining if said selected other manufacturing element has capacity to accept assignment of said product lot predicted to be fabricated; and
assigning said product lot predicted to be fabricated to said selected other manufacturing element for fabrication.

40. The computer integrated manufacturing system of claim 39 wherein selecting placement of one product lot predicted to be fabricated to at least one manufacturing element having a best match to provide capacity for fabrication of said product lot further comprises the steps of:
- if said selected other manufacturing element does not have capacity to accept assignment of said product lot predicted to be fabricated; determining if said selected other manufacturing element can accept assignment of a portion of said product lot predicted to be fabricated; and
- if said selected other manufacturing element can accept assignment of said portion of said product lot predicted to be fabricated, assigning the portion of said product lot predicted to be fabricated.

41. A medium for retaining a computer program which, when executed by a computing system, said program process performs a capacity planning method that allocates usage of a plurality of manufacturing elements of a manufacturing enterprise, the program process comprising the steps of:
- receiving from at least one order management system of said manufacturing enterprise at least one fabrication forecast describing scheduling and types of product lots that are predicted to be fabricated within a first period of time by said manufacturing enterprise;
- receiving from at least one computer integrated manufacturing system rolling statistics of products lots fabricated during a second period of time; and
- planning capacity allocation of product lots predicted to be fabricated to said manufacturing elements by the steps of:
- determining a priority ranking of said product lots predicted to be fabricated from heuristics developed from said product lots fabricated during said second period of time,
- allocating of said predicted product lots to said manufacturing elements, and
- balancing said predicted product lots between said manufacturing elements according to manufacturing element balancing guidelines.

42. The medium of claim 41 wherein said heuristics are developed by the steps of:
- determining a standard priority for said product lots fabricated during said second period of time;
- determining the manufacturing elements employed in fabrication of said product lots fabricated in said second period of time;
- comparing product identification of said product lots predicted to be fabricated with said product lots fabricated in said second period of time;
- assigning the standard priority to said product lots predicted to be fabricated; and
- assigning a major preference and a minor preference for said manufacturing elements for said product lots predicted to be fabricated.

43. The medium of claim 41 wherein said manufacturing elements are selected from the group of manufacturing elements consisting of manufacturing fabrication facilities, manufacturing fabrication areas within a fabrication facility, raw material providers, component part providers, fabrication processing equipment within said fabrication areas, fabrication, verification, and testing equipment associated with said fabrication areas, and fabrication sub-contractors providing fabrication services for said manufacturing fabrication areas.

44. The medium of claim 41 wherein manufacturing element balancing guidelines comprise:
- squeezing one product lot predicted to be fabricated to one of said manufacturing elements rather than transferring said product lot to another of said manufacturing element, if a cost of said transfer is too great;
- balancing fabrication of the plurality of product lots predicted to be fabricated among said manufacturing elements to maintain operation of said manufacturing elements during periods of low utilization of at least one of said manufacturing elements;
- balancing fabrication of the plurality of product lots predicted to be fabricated among said manufacturing elements to adjust placement of the plurality of product lots predicted to be fabricated to eliminate an overloaded utilization of those manufacturing elements with an overloaded utilization; and
- selecting placement of the plurality product lots predicted to be fabricated to at least one manufacturing element having a best match to provide capacity for fabrication of said product lot.

45. The medium of claim 44 wherein squeezing one product lot predicted to be fabricated to one of said manufacturing elements is executed by performing the steps of:
- selecting one manufacturing elements with a capability to process said product lot predicted to be fabricated, but with a utilization approaching a full capacity level;
- selecting a plurality of manufacturing elements each with a capability to process said product lot predicted to be fabricated but with a low utilization;
- determining a first overhead associated with placing the product lot predicted to be fabricated with each of plurality of manufacturing elements;
- determining a second overhead for squeezing said product lot predicted to be fabricated into said manufacturing element with a utilization approaching full capacity; and
- if said first overhead is greater than second overhead, placing said product lot predicted to be fabricated into said manufacturing element with a utilization approaching full capacity.

46. The medium of claim 44 wherein balancing fabrication of the plurality of product lots predicted to be fabricated among said manufacturing elements to maintain operation of said manufacturing elements during periods of low utilization of said manufacturing elements comprises the steps of:
- determining a utilization rate of each of said manufacturing elements;
- if any of said manufacturing elements have a utilization rate less that a differential threshold of other of said manufacturing elements, determining a third overhead for idling manufacturing elements with little or no utilization;
- determining a fourth overhead for maintaining operation in manufacturing elements with little or no utilization; and
- if the fourth overhead is less than the third overhead, assigning at least one product lot predicted to be fabricated to said manufacturing elements with little or no utilization.

47. The medium of claim 46 wherein balancing fabrication of the plurality of product lots predicted to be fabricated among said manufacturing elements to maintain operation of said manufacturing elements during periods of low utiliza tion of said manufacturing elements further comprises the steps of:

if the fourth overhead is greater than the third overhead, squeezing at least one product lot predicted to be fabricated to the other of said manufacturing elements.

48. The medium of claim 44 wherein balancing fabrication of the plurality of product lots predicted to be fabricated among said manufacturing elements to adjust placement of the plurality of product lots predicted to be fabricated to eliminate an overloaded utilization of those manufacturing elements with an overloaded utilization comprises the steps of:

determining the utilization rate of each of the manufacturing elements;

if one of the manufacturing elements has a utilization rate greater than a utilization threshold, determining whether any of the manufacturing elements has a capability matching capability requirements of the manufacturing elements with a utilization rate greater than the utilization threshold; and transferring an assignment of product lots predicted to be fabricated to these at least one of the those manufacturing elements with the capability matching the capability requirements of the product lot predicted to be fabricated.

49. The medium of claim 44 wherein selecting placement of one product lot predicted to be fabricated to at least one manufacturing element having a best match to provide capacity for fabrication of said product lot comprises the steps of:

determining capability requirements for each of the product lots predicted to be fabricated;

determining capabilities for each of the manufacturing elements;

comparing the capabilities of each of the manufacturing elements;

assigning product lots predicted to be fabricated to those manufacturing elements with capabilities that match the capability requirements of the product lots predicted to be fabricated;

determining a utilization rate for each of the manufacturing elements;

determining which of said manufacturing elements have a utilization rate greater than a utilization threshold;

selecting one of other manufacturing elements based on a candidate ranking;

determining if the selected other manufacturing element has a capability that matches the capability requirement of product lot predicted to be fabricated assigned to the manufacturing element with the utilization rate greater than said utilization threshold;

if said capability of said selected other manufacturing element matches said capability requirement, determining if said selected other manufacturing element has capacity to accept assignment of said product lot predicted to be fabricated; and assigning said product lot predicted to be fabricated to said selected other manufacturing element for fabrication.

50. The medium of claim 49 wherein selecting placement of one product lot predicted to be fabricated to at least one manufacturing element having a best match to provide capacity for fabrication of said product lot further comprises the steps of:

if said other manufacturing element does not have capacity to accept assignment of said product lot predicted to be fabricated; determining if said selected other manufacturing element can accept assignment of a portion of said product lot predicted to be fabricated; and if said selected other manufacturing element can accept assignment of said portion of said product lot predicted to be fabricated, assigning the portion of said product lot predicted to be fabricated.

* * * * *